United States Patent
Jung et al.

(10) Patent No.: US 11,876,475 B2
(45) Date of Patent: Jan. 16, 2024

(54) APPARATUS FOR CONTROLLING MOTOR AND METHOD FOR CONTROLLING MOTOR

(71) Applicant: LG ELECTRONICS INC., Seoul (KR)

(72) Inventors: Han Su Jung, Seoul (KR); Seok Hee Cho, Seoul (KR); Soong Keun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 40 days.

(21) Appl. No.: 17/671,785

(22) Filed: Feb. 15, 2022

(65) Prior Publication Data

US 2022/0263436 A1 Aug. 18, 2022

(30) Foreign Application Priority Data

Feb. 15, 2021 (KR) ........................ 10-2021-0019798

(51) Int. Cl.
| | |
|---|---|
| *H02P 27/08* | (2006.01) |
| *H02P 5/50* | (2016.01) |
| *D06F 34/08* | (2020.01) |
| *D06F 37/30* | (2020.01) |

(52) U.S. Cl.
CPC ................ *H02P 5/50* (2013.01); *D06F 34/08* (2020.02); *D06F 37/304* (2013.01)

(58) Field of Classification Search
CPC .... H02P 5/50; H02P 5/74; H02P 25/18; H02P 27/06
See application file for complete search history.

(56) References Cited

U.S. PATENT DOCUMENTS

| 8,245,523 B2 * | 8/2012 | Lee ........................... F24F 1/40 |
| | | 62/177 |
| 2017/0288594 A1 * | 10/2017 | Kasahara .................. H02P 6/04 |
| 2020/0212833 A1 * | 7/2020 | Yamakawa ............. H02P 25/18 |
| 2020/0321893 A1 * | 10/2020 | Hossain ................. B62D 5/005 |
| 2021/0305921 A1 * | 9/2021 | Hatakeyama ..... H02M 7/53871 |

(Continued)

FOREIGN PATENT DOCUMENTS

EP 2072919 A1 * 6/2009 ................ F24F 1/20

*Primary Examiner* — Muhammad S Islam
(74) *Attorney, Agent, or Firm* — KED & ASSOCIATES, LLP

(57) ABSTRACT

Disclosed is a motor control apparatus capable of checking whether there is an abnormality in connections of a plurality of motors, and switching connection schemes between an inverter and the motors or driving the motor in an electronic apparatus including one inverter configured to control a driving operation of the plurality of motors. For example, the motor control apparatus includes an inverter configured to convert DC power into AC power and provide the AC power to one of a plurality of motors, a switch configured to switch connection schemes between the inverter and the plurality of motors, and a controller, and the controller may control the inverter to output an input signal of a predetermined pattern in response to the switching of the connection schemes by the switch, and generate a control signal for controlling the inverter or the switch on the basis of a response signal corresponding to the input signal. Other example embodiments may be provided.

18 Claims, 10 Drawing Sheets

(56) References Cited

U.S. PATENT DOCUMENTS

2021/0362606 A1* 11/2021 White ................. H02M 1/0074
2022/0263436 A1* 8/2022 Jung ......................... H02P 5/50
2022/0316748 A1* 10/2022 Shizu ...................... F24F 11/86

* cited by examiner

APPARATUS FOR CONTROLLING MOTOR AND METHOD FOR CONTROLLING MOTOR

CROSS-REFERENCE TO RELATED APPLICATION

This application claims the benefit of Korean Patent Application No. 10-2021-0019798, filed Feb. 15, 2021, in the Korean Intellectual Property Office, the subject matter of which is hereby incorporated by reference.

BACKGROUND

Field

The present disclosure relates to a motor control apparatus and a motor control method, and one particular implementation relates to a motor control apparatus and a method for controlling driving of a plurality of motors using one inverter.

2. BACKGROUND

With developments of technologies, various electronic apparatuses are widely used. In particular, as a brushless direct current (BLDC) motor having a relatively high energy efficiency is developed, electronic apparatuses equipped with a plurality of motors corresponding to respective functions are being used in various fields so that multiple functions are implemented even in one electronic apparatus.

For example, a clothes treating apparatus may include a circulation pump and a drain pump as a washing apparatus for removing contamination of cloth (laundry) such as clothes, bedding, and the like, and may further include a drying fan as a drying apparatus for drying laundry. In this example, the clothes treating apparatus may separately include motors (for example, a motor corresponding to the circulation pump, a motor corresponding to the drain pump, a motor corresponding to the drying fan) for implementing respective functions of the circulation pump, the drain pump, and the drying fan.

When the electronic apparatus includes a plurality of motors, the electronic apparatus may need to include a number of inverters for controlling driving of the motors as many as corresponding to the number of the motors so that each of the motors is separately operated according to a specified driving condition. However, in order to add inverters to the electronic apparatus, expensive circuit components (such as a power switching device, a capacitor, and a sensing circuit) are integrally added to the electronic apparatus, so that manufacturing costs of the electronic apparatus increases in proportion to an increase in the number of the inverters.

BRIEF DESCRIPTION OF THE DRAWINGS

Arrangements and embodiments may be described in detail with reference to the following drawings in which like reference numerals refer to like elements and wherein.

DETAILED DESCRIPTION

Terms used in example embodiments are general terms that are currently widely used while their respective functions in the present disclosure are taken into consideration. However, the terms may be changed depending on intention of one of ordinary skilled in the art, legal precedents, emergence of new technologies, and the like. Further, in certain cases, there may be terms arbitrarily selected by the applicant, and in this case, the meaning of the term will be described in detail in the corresponding description. Accordingly, the terms used herein are not to be construed simply as its designation but based on the meaning of the term and the overall context of the present disclosure.

Throughout the specification, when a part is referred to as including a component, unless particularly defined otherwise, it means that the part does not exclude other components and may further include other components. Further, terms " . . . er (or)," " . . . module," and the like refer to a unit that processes at least one function or operation, which may be implemented in hardware or software or implemented in a combination of hardware and software.

The expression "at least one of a, b, and c," should be understood as including only a, only b, only c, both a and b, both a and c, both b and c, or all of a, b, and c.

Example embodiments of the present disclosure that are easily performed by those skilled in the art will be described in detail below with reference to the accompanying drawings. The present disclosure may, however, be implemented in many different forms and should not be construed as being limited to the example embodiments described herein.

Figure 1:
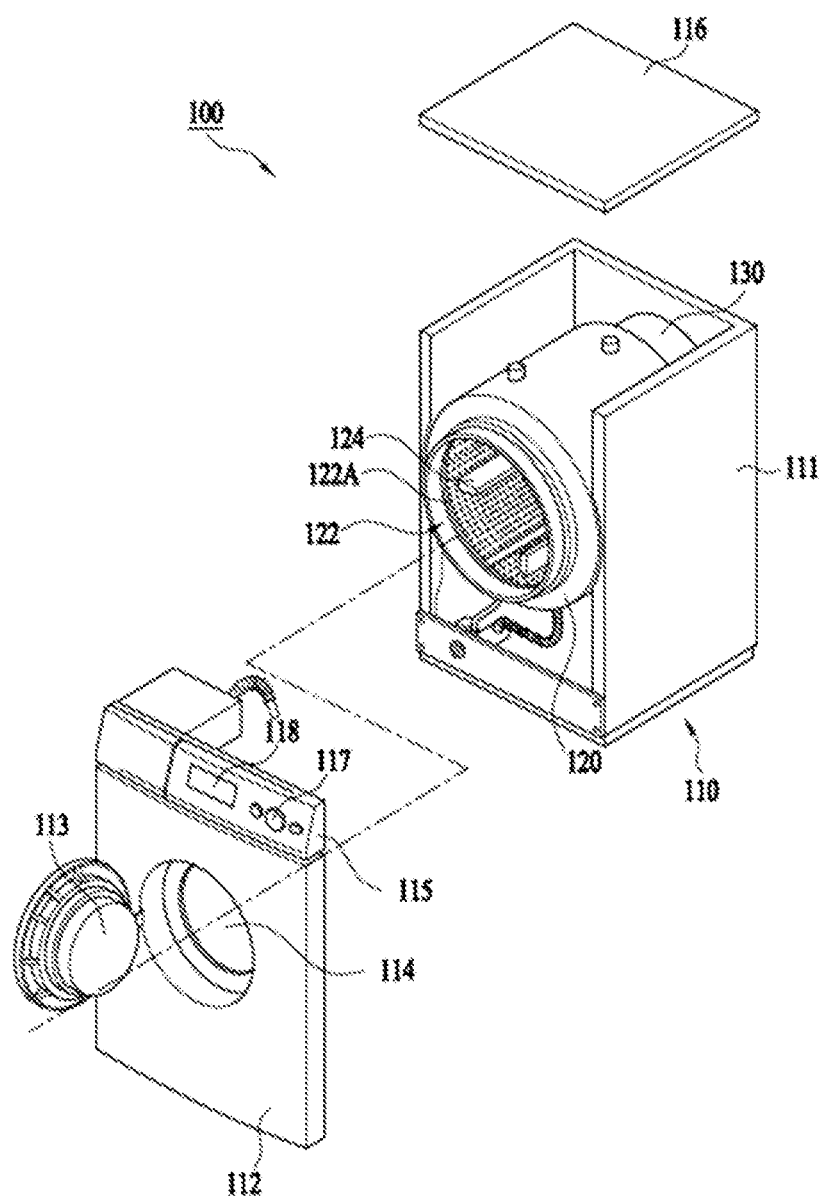
FIG. 1 is a diagram illustrating a clothes treating apparatus according to an example embodiment of the present disclosure.

FIG. 1 is a diagram illustrating a clothes treating apparatus according to an example embodiment of the present disclosure. A clothes treating apparatus 100 according to various example embodiments may include a drum type clothes treating apparatus in which cloth is inserted into a washing tub (for example, a drum 122) open in the front thereof. However, the clothes treating apparatus 100 described in the present disclosure is not limited to the above-described drum type structure, and the clothes treating apparatus 100 according to various example embodiments may include a full-automatic clothes treating apparatus using a method of inserting cloth into a washing tub open in an upper surface direction. For example, the clothes treating apparatus 100 may correspond to an apparatus that performs at least one of washing, rinsing, dewatering, and drying on the cloth inserted into the washing tub.

According to an example embodiment, the clothes treating apparatus 100 may include at least one of a cabinet 110 forming an exterior thereof, a tub 120 disposed inside the cabinet 110 and supported by the cabinet 110, a drum 122, which is disposed inside the tub 120 and in which cloth is inserted and washed, a motor 130 configured to drive the drum 122, a circulation pump disposed outside a cabinet body 111 and configured to supply washing water to the inside of the cabinet 110, and a drain pump configured to discharge the washing water to the outside. In addition, according to an example embodiment, the clothes treating apparatus 100 may further include a drying fan that dries the washed cloth.

The drum 122 may include a plurality of through-holes 122A through which washing water passes, and may further include a lifter 124 disposed on an inner side surface of the drum 122 such that laundry is lifted to a certain height when the drum 122 rotates and then is dropped due to gravity.

The cabinet 110 may include at least one of the cabinet body 111, a cabinet cover 112 that is disposed on the front of the cabinet body 111 and combined with the cabinet body 111, a control panel 115 that is disposed on an upper side of the cabinet cover 112 and combined with the cabinet body 111, and a top plate 116 that is disposed on an upper side of the control panel 115 and combined with the cabinet body 111.

The cabinet cover 112 may include a cloth entrance hole 114 through which cloth enters or exits, and a door 113 disposed to be rotatable to the left and right such that the cloth entrance hole 114 may be open and closed.

The control panel 115 may include operation keys 117 for operating operation states of the clothes treating apparatus 100, and a display 118 disposed on one side of the operation keys 117 and configured to display the operation states of the clothes treating apparatus.

The operation keys 117 and/or the display 118 of the control panel 115 may be electrically connected to a controller (for example, a controller 210 of FIG. 2), and each of components of the clothes treating apparatus 100 may be electrically controlled by the controller.

The clothes treating apparatus 100 may further include various sensors and other devices. For example, the clothes treating apparatus may further include a vibration sensor for measuring the amount of vibration of the drum 122, or may further include a device for detecting and reducing vibration generated according to the amount of eccentricity of cloth accommodated in the drum 122.

Figure 2:
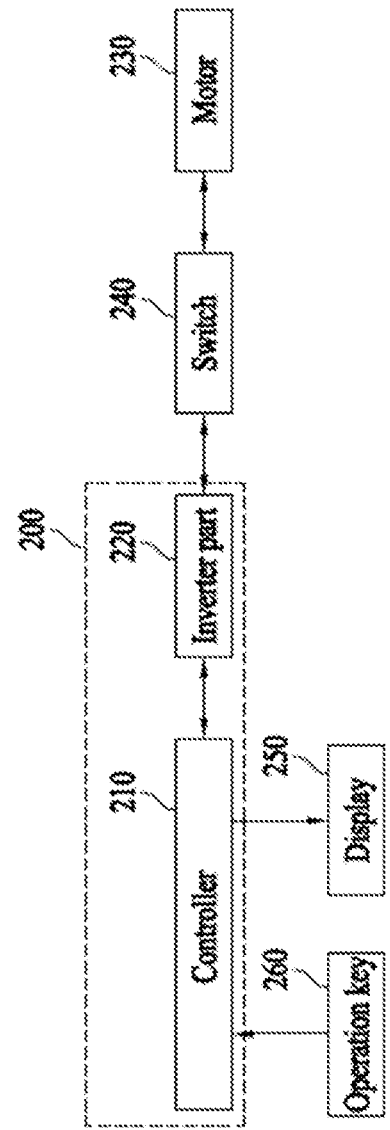
FIG. 2 is a schematic configuration block diagram of an electronic apparatus including a motor control apparatus according to an example embodiment of the present disclosure.

FIG. 2 is a schematic configuration block diagram of an electronic apparatus including a motor control apparatus according to an example embodiment of the present disclosure. An electronic apparatus (for example, the clothes treating apparatus 100 of FIG. 1) according to various example embodiments may include at least one of a motor 230, a motor control apparatus 200 configured to control the motor 230, an input module (for example, an operation key 260), and an output module (for example, a display 250).

According to various example embodiments, the motor 230 may include a plurality of motors. As an example, the motor 230 may include a first motor corresponding to a circulation pump and a second motor corresponding to a drying fan. As another example, the motor 230 may include a first motor corresponding to a circulation pump, a second motor corresponding to a drying fan, and a third motor corresponding to a drain pump. The plurality of motors may be provided with a circuit configuration so that a driving operation may be controlled by a specific single inverter (included as an inverter part 220 of the motor control apparatus 200).

For example, each of the above-described plurality of motors (included in the motor 230) may include a stator and a rotor, and may include a three-phase motor in which the rotor rotates as alternating current (AC) power of a predetermined frequency is applied to a coil of the stator. For example, the plurality of motors may include a surface-mounted permanent magnet synchronous motor (SMPMSM), an interior permanent magnet synchronous motor (IPMSM), and a synchronous reluctance motor (Synrm).

According to various example embodiments, the motor control apparatus 200 may include the inverter part 220, a switch 240, and a controller 210. For example, the motor control apparatus 200 may correspond to an apparatus for overall controlling driving operation of the motor 230. In at least one embodiment, the switch 240 may be considered as part of the motor control apparatus 200.

The inverter part 220 may be an inverter configured to receive direct current (DC) power from the outside, convert the DC power into AC power, and provide the converted AC power to the motor 230, or may correspond to a configuration including the inverter. For example, the inverter part 220 may include a plurality of inverter switching elements, and convert smoothed DC power into three-phase AC power having a predetermined frequency according to an on/off operation of the switching element, and output the three-phase AC power to the motor 230. For example, the switching elements of the inverter part 220 may be controlled to be an on/off state based on an inverter control signal generated from the controller 210 (or provided from the controller 210), and the AC power corresponding to the predetermined frequency may be output to the motor 230 through an output terminal of the inverter part 220. For example, the inverter control signal may be a switching control signal for a pulse width modulation (PWM) method, and the inverter control signal may be provided based on an output current detected by an output current detector, which may be described below, and an output voltage detected by an output voltage detector.

The switch 240 may switch connection schemes (or different connections) between the inverter and the motors so that the motor control apparatus 200 may selectively drive two or more motors (for example, the motor 230) through a single inverter (for example, the inverter part 220). For example, the switch 240 may switch connections such that the inverter part 220 is connected to any one of the plurality of motors (of the motor 230) according to the control signal of the controller 210.

For example, the switch 240 may include a plurality of three-contact relays. In various example embodiments, a connection-switching operation of the switch 240 may be based on the control signal that enables each of the plurality of three-contact relays to be open and closed.

For example, each of the three-contact relays may include a common terminal, a normally open terminal, and a normally closed terminal. In an example embodiment, the normally open terminal and the normally closed terminal of the three-contact relay may be respectively connected to different motors (for example, to an input terminal of each of the motors). For example, in the three-contact relay, the common terminal may be connected to the inverter part 220, the normally open terminal may be connected to one of the plurality of motors (for example, a first motor), and the normally closed terminal may be connected to another one of the motors (for example, a second motor).

For example, the switch 240 may include a total number of relays (for example, three-contact relays) which corresponds to the number of the motors driven by one inverter. For example, when the motor 230 driven by the inverter part 220 includes two motors (such as a first motor and a second motor), the switch 240 may include a first relay and a second relay for connecting the inverter to the first motor and the second motor, respectively. For example, when the motor 230 driven by the inverter part 220 includes three motors (such as a first motor, a second motor, and a third motor), the switch 240 may include a first relay, a second relay, and a third relay.

For example, each of the motors (constituting the motor 230) may include three input terminals. In an example embodiment, when the motor 230 includes three motors, the switch 240 includes first to third relays, the three input terminals provided in one of the plurality of motors (for example, a first motor) may be respectively connected to a particular terminal (for example, a normally open terminal) of the first relay, a particular terminal (for example, a normally closed terminal) of the second relay, and a particular terminal (for example, a normally closed terminal) of the third relay. In addition, the three input terminals provided in another one motor (for example, a second motor) may be respectively connected to a particular terminal (for example, a normally closed terminal) of the first relay, a particular terminal (for example, a normally open terminal) of the second relay, and a particular terminal (for example, a normally closed terminal) of the third relay, and the three input terminals provided in the other one motor (for example, a third motor) may be respectively connected to a particular terminal (for example, the normally closed terminal) of the first relay, a particular terminal (for example, the normally closed terminal) of the second relay, and a particular terminal (for example, the normally open terminal) of the third relay.

In another example embodiment, when the motor 230 includes two motors, the switch 240 includes first and second relays, three input terminals provided in each of the motors (for example, a first motor and a second motor) may be respectively connected to a particular terminal (for example, a normally open terminal) of the first relay, a particular terminal (for example, a normally closed terminal) of the second relay, and a particular output terminal of the inverter part 220.

The controller 210 may control the driving operation of the motor 230 using at least one of the inverter part 220 and the switch 240.

For example, the controller 210 may provide (or generate) a control signal for switching connection schemes so that the inverter part 220 is connected to one of the plurality of motors (included in the motor 230) and provide the control signal to the switch 240, and when it is confirmed that a connection is normal through a predetermined connection abnormality check procedure, the controller 210 may provide (or generate) a control signal for driving the specific motor connected to the inverter part 220 and provide the control signal to the inverter part 220.

According to various example embodiments, the controller 210 may control the inverter part 220 to output an input signal of a specific pattern for checking whether there is an abnormality in the connections in response to switching connection schemes (i.e., changing connections) of the motor 230 by the switch 240. In addition, the controller 210 may identify whether there is an abnormality in the connections of the circuit based on f a response signal detected in response to the input signal, and may provide (or generate) a predetermined control signal for controlling at least one of the inverter part 220 or the switch 240 based on a result of the identification.

For example, in response to the operation in which the connection schemes between the inverter part 220 and the motor 230 are switched by the switch 240, the controller 210 may check whether the connection according to the switching is abnormal. For example, the controller 210 may control the inverter part 220 to apply an input signal of a specific pattern in response to the switching of the connection schemes, and check a response signal corresponding to the applied input signal to check whether there is an abnormality in the connections.

According to various example embodiments, the input signal of the specific pattern applied to the motor 230 from the inverter part 220 may correspond to any one of a DC pattern signal (for example, a DC signal) or an AC pattern signal (for example, an AC signal).

For example, the controller 210 may control the inverter part 220 to sequentially apply, as the input signal to check whether there is an abnormality in the connections, DC sub-pattern signals having different magnitudes (for example, a DC sub-pattern signal of a first magnitude and a DC sub-pattern signal of a second magnitude). For another example, the controller 210 may control the inverter part 220 to sequentially apply, as the input signal to check whether the connection is abnormal, AC sub-pattern signals having different amplitudes (for example, an AC sub-pattern signal of a first amplitude and an AC sub-pattern signal of a second amplitude).

The controller 210 may control the switching operation of the inverter part 220 through a sensorless method. For example, the controller 210 may acquire a value of an output current detected by the output current detector, a value of an output voltage detected by the output voltage detector, and check characteristics of the response signal for checking whether there is an abnormality in the connections by using the output current detector and the output voltage detector.

The output current detector may detect an output current flowing between the inverter part 220 and the motor 230. That is, current flowing to the motor 230 may be detected. For example, the output current detector may detect all of output currents (for example, ia, ib, and ic) of each phase, or detect output currents of two phases using a three-phase balance and estimate an output current of the remaining phase. The output current detector may be positioned between the inverter part 220 and the motor 230, and a current transformer (CT), a shunt resistor, and/or the like may be used to detect current. For example, when a shunt resistor is used, it may be configured such that three shunt resistors are positioned between the inverter part 220 and the motor 230, or may be connected respectively, at one terminal thereof, to three lower arm switching elements of the inverter part 220. As another example, two shunt resistors may be used, and as still another example, it may be configured such that one shunt resistor is used and the shunt resistor is positioned between the specific capacitor and the inverter part 220. For example, the detected output current may include a pulse-type discrete signal, and a predetermined control signal may be provided (or generated) by the controller 210 based on the detected output current.

The output voltage detector is positioned between the inverter part 220 and the motor 230, and may detect an output voltage that is applied to the motor 230 from the inverter part 220. When the inverter part 220 is controlled by a PWM-based switching control signal, the output voltage may be PWM-based pulse type voltage. For example, the output voltage detector may include a resistance element electrically connected between the inverter part 220 and the motor 230, and a comparator connected to one end of the resistance element. The detected output voltage may include a pulse-type discrete signal, and a predetermined control signal may be provided (or generated) by the controller 210 on the basis of the detected output voltage.

The controller 210 may calculate (or determine) a parameter value corresponding to the specific motor connected to the inverter part 220 on the basis of a response signal corresponding to the input signal. On the basis of the parameter value calculated on the basis of the response signal, the controller 210 may identify the type of the specific motor currently connected to the inverter part 220 according to the switching of the connection schemes of the circuit.

The controller 210 may check (or determine) a motor driving command such as a driving start command of the motor 230 or a driving stop command of the motor 230 on the basis of a user input related to a washing operation such as washing, rinsing, dehydration, or drying received using a predetermined input module such as the operation key 260, and may perform a driving control operation of the motor 230 on the basis of the motor driving command. For example, the controller 210 may apply an input signal of a predetermined pattern before starting the motor 230, identify the type of the motor connected to the inverter part 220 on the basis of a response signal corresponding to the input signal, and check whether the identified motor corresponds to the washing operation to be currently carried out.

The controller 210 may use a predetermined output module such as the display 250 and control the display 250 to display status information related to washing operations including at least some of a washing course, a washing time, a dehydration time, and a rinsing time.

The motor control apparatus 200 according to an example embodiment may further include a memory for storing instructions related to the control command (for example, a control algorithm) of the controller 210 or data related to setting for driving the motor. For example, the motor control apparatus 200 may store threshold data used to identify whether there is an abnormality in the connections, parameter value-related data corresponding to the plurality of motors included in the motor 230, and the like in the memory, and may check whether there is an abnormality in the connections, for example, the motor connected to the inverter corresponds to a specified washing operation by using the corresponding data. The motor control apparatus 200 may further include a communication module configured to transmit and receive commands or pieces of data stored in the memory to and from an external device.

Figure 3:
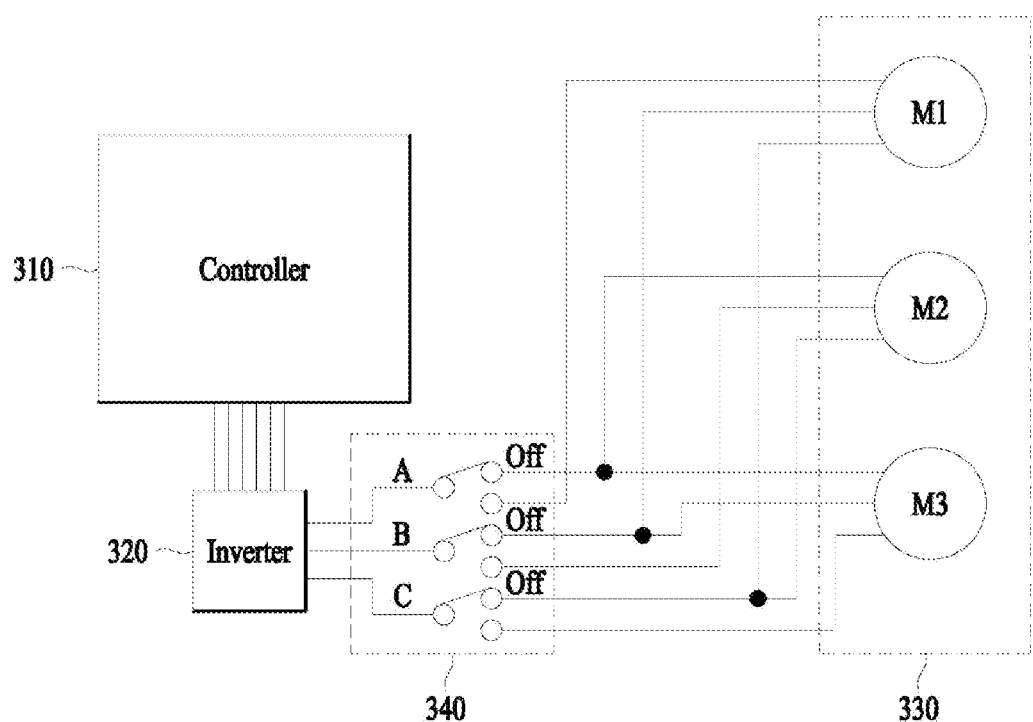
FIG. 3 is a schematic circuit diagram for describing connection scheme switching (or connection switching) by a motor control apparatus according to an example embodiment of the present disclosure.

FIG. 3 is a schematic circuit diagram for describing connection scheme switching (or connection switching) by a motor control apparatus according to an example embodiment of the present disclosure. A motor control apparatus (for example, the motor control apparatus 200 of FIG. 2) according to an example embodiment may include a controller 310, an inverter 320 configured to control driving of a plurality of motors 330 according to a predetermined control signal generated by (or provided by) the controller 310, and a switch 340 configured to switch connection structures between the inverter 320 and the motors 330 according to a control signal generated by the controller 310.

The inverter 320 may convert a predetermined DC power into AC power and provide the AC power to an output terminal. The output terminal of the inverter 320 may be connected to the switch 340, and may be connected to any one of the plurality of motors 330 by the switch 340 in order to supply the AC power to the specific motor (for example, input terminals of the motor). For example, the output terminal of the inverter 320 may include three output terminals respectively corresponding to three phases.

The switch 340 may include a plurality of relays in which a total number of the relays corresponds to the total number of the plurality of motors 330. For example, as shown in FIG. 3, the motors 330, whose driving is controlled by the inverter 320, may include a first motor M1, a second motor M2, and a third motor M3, and the relays of the switch 340 may include a first relay A, a second relay B, and a third relay C.

For example, each of the plurality of relays included in the switch 340 may include a three-contact relay, which each includes a common terminal, a normally open terminal, and a normally closed terminal.

For example, the common terminals of the plurality of relays (the first relay A, the second relay B, and the third relay C) may be connected to the three output terminals of the inverter 320, respectively. In addition, the normally open terminals and the normally closed terminals of the plurality of relays may be connected to input terminals of the different motors, respectively.

Each of the relays constituting the switch 340 may change a state (for example, an ON state and an OFF state) thereof on the basis of a control signal generated by the controller 310.

For example, the first relay A may connect the inverter 320 to the first motor M1 in an ON state and may connect the inverter 320 to the second motor M2 and the third motor M3 in an OFF state. The second relay B may connect the inverter 320 to the second motor M2 in an ON state, and connect the inverter 320 to the first motor M1 and the third motor M3 in an OFF state. The third relay C may connect the inverter 320 to the third motor M3 in an ON state, and connect the inverter 320 to the first motor M1 and the second motor M2 in an OFF state.

For example, when the first motor M1 will be driven by the controller 310, the controller 310 may provide (or generate) a control signal to turn on the first relay A, to turn off the second relay B, and to turn off the third relay C. According to the control signal, the first relay A may be switched to the ON state, the second relay B and the third relay C may be switched to the OFF state, and accordingly, the three-phase output terminals of the inverter 320 may be connected to the three-phase input terminals of the first motor M1, respectively.

Further, when the second motor M2 will be driven by the controller 310, the controller 310 may provide (or generate) a control signal to turn off the first relay A, to turn on the second relay B, and to turn off the third relay C. According to the above-described control signal, when the first relay A and the third relay C are switched to the OFF state, and the second relay B is switched to the ON state, and the three-phase output terminals of the inverter 320 may be connected to the three-phase input terminals of the second motor M2, respectively.

Further, when the third motor M3 will be driven by the controller 310, the controller 310 may provide (or generate) a control signal to turn off the first relay A and the second relay B, and to turn on the third relay C. Accordingly, the first relay A and the second relay B are switched to the OFF state, and the third relay C is switched to the ON state, and the three-phase output terminals of the inverter 320 may be connected to the three-phase input terminals of the third motor M3, respectively.

According to an example embodiment, each of the first motor M1, the second motor M2, and the third motor M3 of FIG. 3 may correspond to any one of a motor mounted on a circulation pump provided in a clothes treating apparatus (for example, the clothes treating apparatus 100 of FIG. 1), a motor mounted on a drain pump, and a motor mounted on a drying fan. For example, the controller 310 of the motor control apparatus may control the switch 340 to connect the motor corresponding to the washing operation to be carried out to the inverter 320, and control the inverter 320 to drive the motor only when the connection switching is successfully completed.

Figure 4:
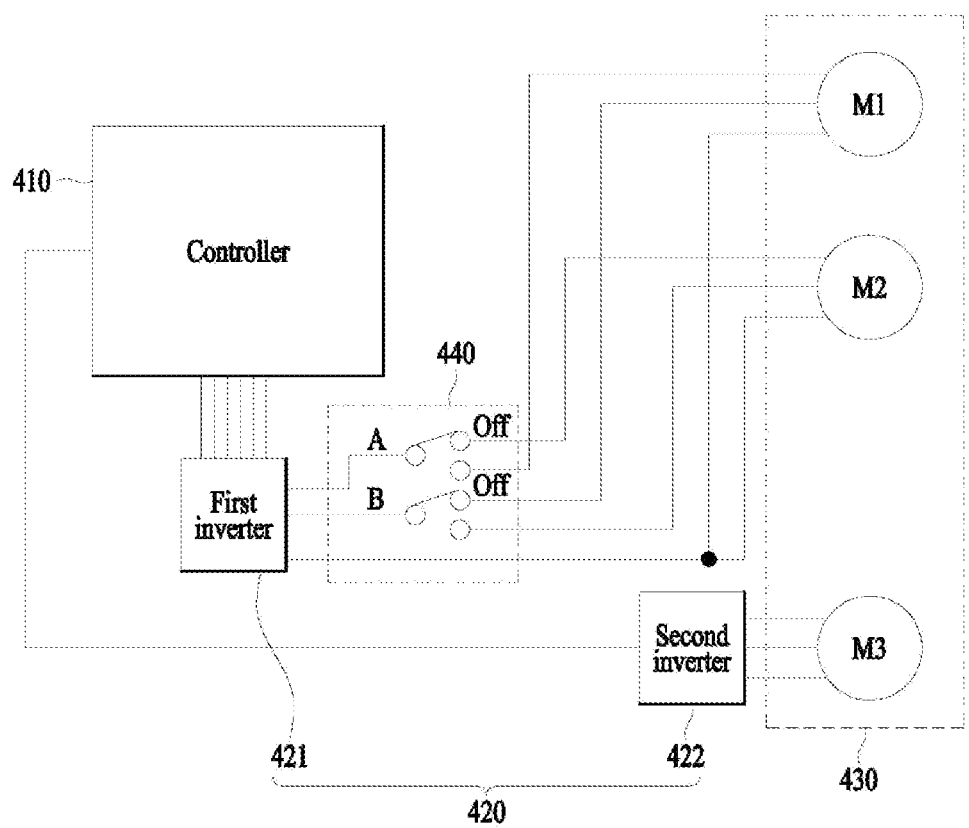
FIG. 4 is a schematic circuit diagram for describing connection scheme switching (or connection switching) by a motor control apparatus according to an example embodiment of the present disclosure.

FIG. 4 is a schematic circuit diagram for describing connection scheme switching (or connection switching) by a motor control apparatus according to an example embodiment of the present disclosure. A motor control apparatus (for example, the motor control apparatus 200 of FIG. 2) according to an example embodiment may include a controller 410, an inverter part 420 (or inverter) configured to control driving of motors 430 based on a predetermined control signal generated by the controller 410, and a switch 440 configured to switch connection schemes (or connection switching) between the motors 430 and the inverter part 420 based on a control signal from the controller 410.

According to an example embodiment, the motors 430 may include a first motor M1, a second motor M2, and a third motor M3. For example, driving operation of the first motor M1 and the second motor M2 may be controlled by a first inverter 421, and driving operation of the third motor M3 may be controlled by a second inverter 422.

For example, the first motor M1 and the second motor M2 may each be a motor mounted on a circulation pump of a clothes treating apparatus (for example, the clothes treating apparatus 100 of FIG. 1) or a motor mounted on a drying fan, and the third motor M3 may be a motor mounted on a drain pump of the clothes treating apparatus. The driving of the third motor M3 may be controlled by a separate inverter (for example, the second inverter 422) regardless of the driving of the first motor M1 and the second motor M2, and the third motor M3 may be independently driven together with either the first motor M1 or the second motor M2 at the same time.

The switch 440 may include a plurality of relays. For example, the switch 440 may include a plurality of relays in which a total number of the relays corresponds to a total number of the motors (for example, the first motor M1 and the second motor M2) controlled by one inverter (for example, the first inverter 421). For example, as shown in FIG. 4, the switch 440 according to an example embodiment may include a first relay A and a second relay B each connected to one of three output terminals of the first inverter 421.

Each of the plurality of relays is a three-contact relay, and may include a common terminal, a normally open terminal, and a normally closed terminal. For example, the common terminal of each of the relays may be connected to any one of the output terminals of the first inverter 421, and the normally open terminal and the normally closed terminal of each of the relays may be connected to input terminals of the different motors, respectively.

Each of the motors 430 may include three input terminals, one of the input terminals of the motor (for example, the first motor M1 or the second motor M2) whose driving is controlled by the first inverter 421 may be connected to the first relay A, and another one of the input terminals may be connected to the second relay B. The remaining one of the input terminals may be directly connected to the specific output terminal of the first inverter 421 without passing through the specific relay.

In an example embodiment, the first relay A may be connected to the first motor M1 in an ON state and may be connected to the second motor M2 in an OFF state, and the second relay B may be connected to the second motor M2 in an ON state and may be connected to the first motor M1 in an OFF state.

For example, when the first motor M1 will be driven by the controller 410, the controller 410 may generate (or provide) a control signal to turn on the first relay A and to turn off the second relay B. According to the control signal, the first relay A may be in an ON state and the second relay B may be in an OFF state, and the three-phase output terminals of the first inverter 421 may be connected to the three-phase input terminals of the first motor M1, respectively.

For example, when the second motor M2 will be driven by the controller 410, the controller 410 may generate (or provide) a control signal to turn off the first relay A and to turn on the second relay B. According to the control signal, the first relay A may be in an OFF state and the second relay B may be in an ON state, and thus, the three-phase output terminals of the first inverter 421 may be connected to the three-phase input terminals of the second motor M2, respectively.

Meanwhile, each of three-phase input terminals of the third motor M3 may be always connected to any one of the three-phase output terminals of the second inverter 422. The controller 410 may control the driving of the third motor M3 using the second inverter 422.

Figure 5:
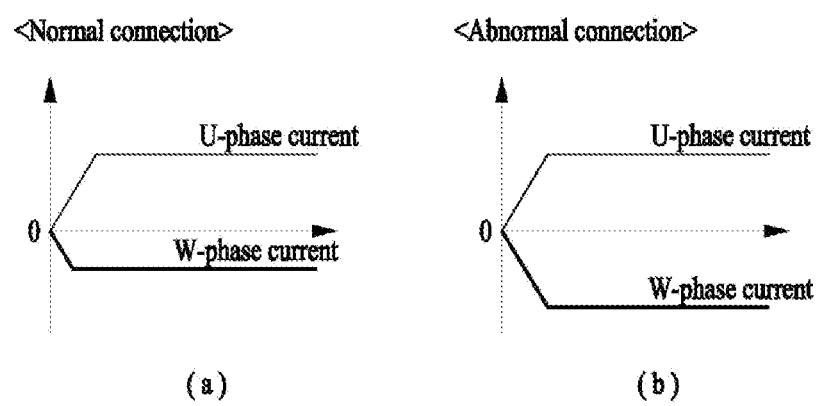
FIGS. 5(a) and (b) are schematic graphs for describing a method for checking an abnormal connection by the motor control apparatus according to an example embodiment of the present disclosure.
Figure 6:
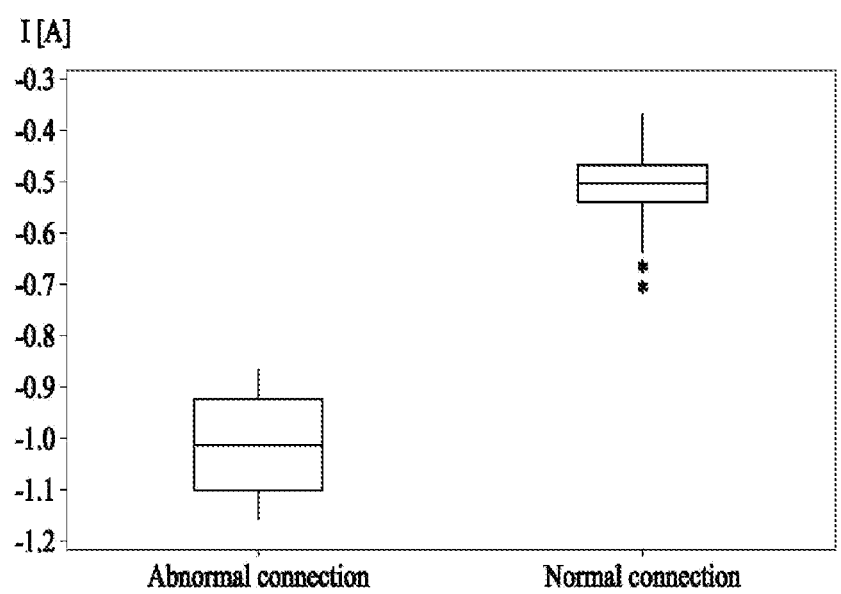
FIG. 6 is a schematic graph for describing the method for checking the abnormal connection by the motor control apparatus according to an example embodiment of the present disclosure.

FIGS. 5 and 6 are schematic graphs for describing a method for checking an abnormal connection by the motor control apparatus according to an example embodiment of the present disclosure.

In the motor control apparatus according to various example embodiments of the present disclosure, the inverter may convert DC voltage into AC voltage of three phases (for example, a U-phase, a V-phase, and a W-phase) and provide the AC voltage to the motor side. In addition, the controller may control the inverter through PWM.

The controller may control an operation of the switch to switch circuit connection schemes between the inverter and the plurality of motors, and may control the inverter to output an input signal of a predetermined pattern from the inverter in response to the operation of the switch of switching the circuit connection schemes. In addition, the controller may detect a response signal corresponding to the input signal through the output current detector or the output voltage detector.

For example, an input signal of a predetermined pattern, which is output to detect whether there is an abnormality in the circuit connections, may correspond to any one of a DC signal, a DC voltage signal, an AC signal, or an AC voltage signal.

For example, the controller may output an input signal through one of output terminals of three phases (a U-phase, a V-phase, and a W-phase) of the inverter, and detect a response signal flowing through another terminal.

The controller may check whether there is an abnormality in the connections on the basis of the detected response signal.

For example, referring to FIG. 5, in the motor control apparatus according to an example embodiment, the controller may output a U-phase current as the input signal and detect a W-phase current (or a V-phase current) as the response signal.

When a magnitude of the detected response signal is within a specified range, the controller may determine that the circuit connection of the motor is normal. In this case, the controller may generate a control command for controlling the inverter to start the driving of the motor.

In addition, when the magnitude of the response signal exceeds the specified range, the controller may determine that the circuit connection of the motor is abnormal. In this case, the controller may provide a notification related to the abnormal connection through the output module, or generate (or provide) a control command for controlling the switch to again change the connection state of the circuit.

For example, when a response signal having a magnitude less than a magnitude of the input signal is detected, it may be determined that the circuit is normally connected, and when a response signal having a magnitude substantially equal to the magnitude of the input signal is detected or a response signal of a magnitude of 0 is detected, the controller may determine that abnormality has occurred in the circuit connection.

According to some example embodiments, the controller may determine that the circuit is normally connected when the magnitude of the response signal is within a specified first range, and may determine that the circuit is abnormally connected when the magnitude of the response signal is within a specified second range.

For example, when the magnitude of the response signal is outside the first range and the second range, the controller may control to perform the operation of checking whether there is an abnormality in the connections again. For example, the controller may apply an input signal different from the previously applied input signal, and detect a response signal corresponding to the input signal to check again whether there is an abnormality in the connections. For example, when a U-phase DC signal is previously applied as the input signal, in the operation of checking whether there is an abnormality in the connections, the controller may apply an AC signal other than the DC signal as the input signal, or apply an input signal of a V-phase or a W-phase and detect a response signal according thereto.

Figure 7:
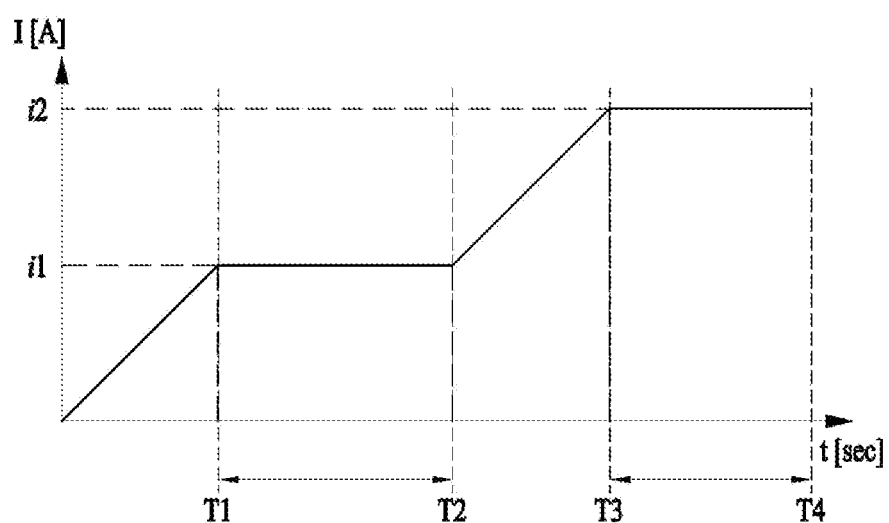
FIG. 7 is a diagram for describing an input signal of a motor control apparatus according to an example embodiment.
Figure 8:
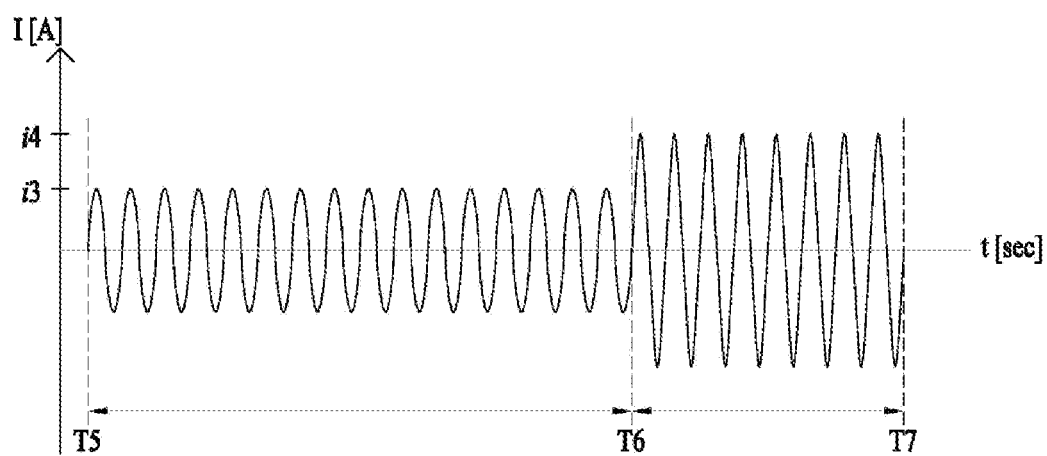
FIG. 8 is a diagram for describing the input signal of the motor control apparatus according to an example embodiment.

FIGS. 7 and 8 are diagrams for describing an input signal of a motor control apparatus according to an example embodiment.

When the connection schemes between the motor and the inverter are switched by the switch, the motor control apparatus according to various example embodiments may apply an input signal of a predetermined pattern through the inverter, and check a parameter value corresponding to the motor connected to the inverter on the basis of a response signal corresponding to the input signal.

For example, the motor control apparatus may check at least one of a phase resistance value or an inductance value corresponding to the motor connected to the inverter on the basis of the response signal.

The motor control apparatus may identify whether there is an abnormality in the connections of the circuit on the basis of the parameter value.

According to an example embodiment, the input signal applied by the motor control apparatus may include DC sub-pattern signals having different magnitudes, for example, a DC sub-pattern signal of a first magnitude and a DC sub-pattern signal of a second magnitude. The DC sub-pattern signal of the first magnitude and the DC sub-pattern signal of the second magnitude may be sequentially output through the inverter. The input signal may be a current signal or a voltage signal. For example, as shown in FIG. 7, a sub-pattern current signal of a first magnitude i1 may be applied from T1 to T2, and a sub-pattern current signal of a second magnitude i2 may be applied from T3 to T4.

For example, the controller of the motor control apparatus may check a current magnitude $I_{ds1}$ and a voltage magnitude $V_{ds1}$ in a section between T1 and T2, and check a current magnitude $I_{ds2}$ and the voltage magnitude $V_{ds2}$ in a section between T3 and T4, and estimate a resistance value $R_s$ corresponding to the motor connected to the inverter using Equation 1 below.

$$R_s = \frac{V_{ds2}^r - V_{ds1}^r}{i_{ds2}^r - i_{ds1}^r} \qquad \text{[Equation 1]}$$

According to another example embodiment, the input signal may include AC sub-pattern signals having different amplitudes, for example, an AC sub-pattern signal of a first amplitude and an AC sub-pattern signals of a second amplitude. The AC sub-pattern signal of the first amplitude and the AC sub-pattern signal of the second amplitude may be sequentially output through the inverter and may be AC signals or AC voltage signals. For example, as shown in FIG. 8, a sinusoidal sub-pattern current signal of a first amplitude i3 may be applied in a section between T5 and T6 as the input signal, and a sinusoidal sub-pattern current signal of a second amplitude i4 may be applied in a section between T6 and T7. For example, the motor control apparatus may apply a sinusoidal signal of a specific frequency (for example, 60 Hz) of an arbitrary control angle (or phase) as the input signal regardless of a position of the rotor of the motor.

For example, the controller may check values of $i_{dh}$, $i_{qh}$, and $V_{qh}$ in each of the section between T6 and T6 and the section between T6 and T7. In addition, the controller may estimate an inductance value $L_s$ corresponding to the motor connected to the inverter using Equation 2 below.

$$L_s = \frac{(v_{qh2} - v_{qh1}) - R_s(i_{qh2} - i_{qh1})}{\omega_h(i_{dh2} - i_{dh1})} \qquad \text{[Equation 2]}$$

The motor control apparatus according to various example embodiments may estimate a parameter value (for example, a phase current value or an inductance value) of the motor on the basis of a current value and/or a resistance value of a response signal corresponding to an input signal of a predetermined pattern, and may identify the type of the motor connected to the inverter on the basis of the estimated parameter value of the motor. The controller may check whether the motor to be currently started in the electronic apparatus (for example, the clothes treating apparatus) corresponds to the motor connected to the inverter, and when the motor corresponding to the specific driving command is not connected to the inverter, the controller may generate a control command for switching the connection schemes of the circuit again and provide the control command to the switch.

Thus, when the motor connected to the inverter is not the motor to be currently started, the motor control apparatus may not drive the motor even when the inverter is normally connected to the specific motor, and may control to change the connection state between the motor and the inverter in order to prevent malfunctions.

Figure 9:
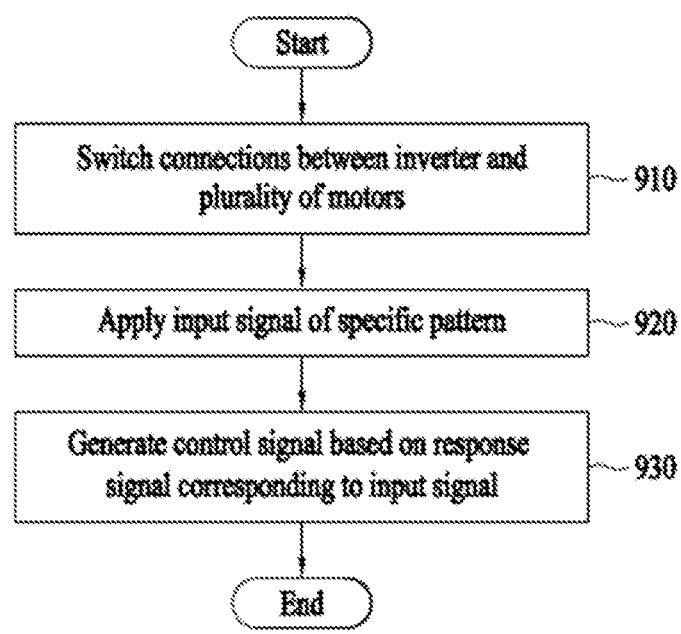
FIG. 9 is a flowchart of a motor control method according to an example embodiment of the present disclosure.

FIG. 9 is a flowchart of a motor control method according to an example embodiment of the present disclosure. The motor control apparatus (for example, the motor control apparatus 200 of FIG. 2) may switch connection schemes between the inverter and the plurality of motors in operation 910.

For example, the controller of the motor control apparatus may control the switch by generating a control signal for switching the connection schemes between the plurality of motors connected to one inverter. The switch may perform a switching operation of predetermined relays so that the inverter is connected to the specific motor according to the control signal related to the connection scheme switching.

In operation 920, when the connection schemes of the circuit are switched by the switch, the motor control apparatus may provide a control signal to the inverter in response to the completion of the switching operation so that an input signal of a specific pattern is applied through the inverter.

In operation 930, the motor control apparatus may detect a response signal corresponding to the input signal applied from the inverter, and may identify whether there is an abnormality in the connections on the basis of characteristics of the response signal.

For example, when it is determined that the inverter and the specific motor are normally connected on the basis of the response signal corresponding to the input signal, the motor control apparatus may generate a control signal for driving the motor and provide the control signal to the inverter. Meanwhile, when it is determined that the inverter and the specific motor are abnormally connected, the motor control apparatus may generate a control signal for switching the connection states of the circuit again instead of driving the motor, and provide the control signal to the switch, and when it is determined that the circuit is normally connected, the motor control apparatus may provide a control signal for starting the motor.

Figure 10:
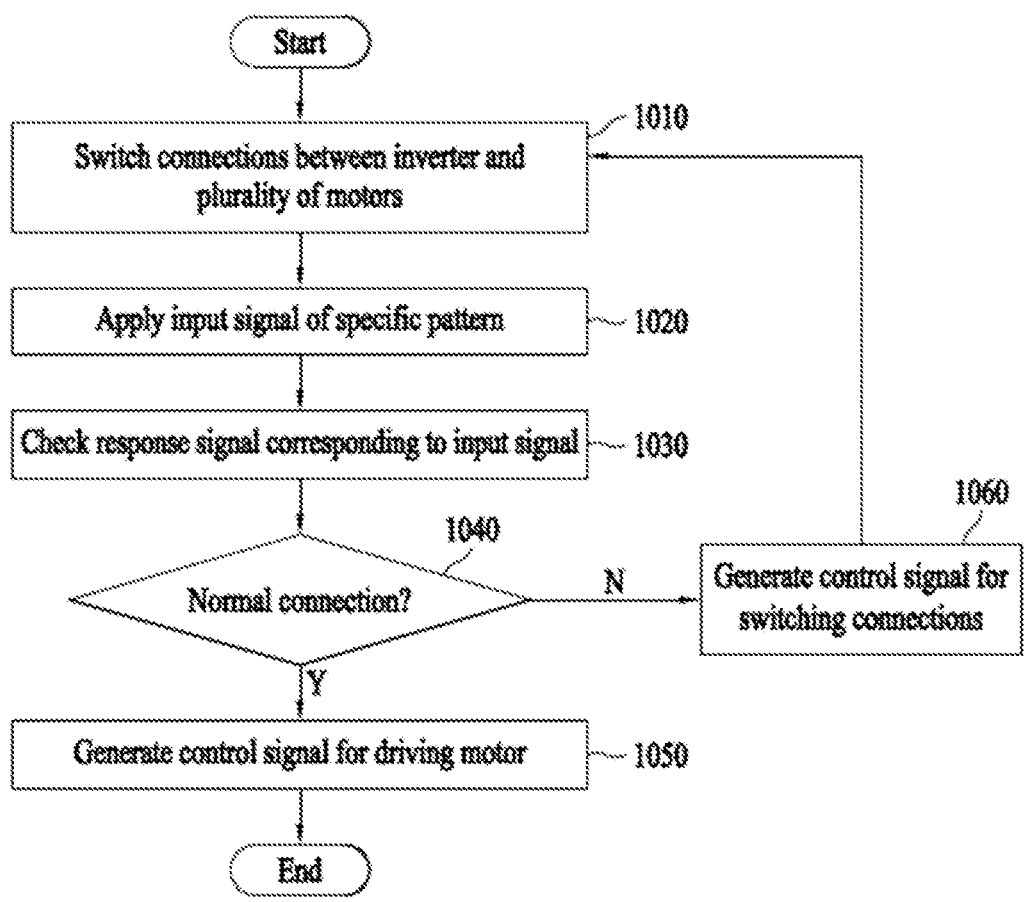
FIG. 10 is a flowchart of a motor control method according to an example embodiment of the present disclosure.

FIG. 10 is a flowchart of a motor control method according to an example embodiment of the present disclosure. The motor control apparatus (for example, the motor control apparatus 200 of FIG. 2) may control the inverter to be connected to any one of the plurality of motors by switching connection schemes between the inverter and the motors in operation 1010, may control the inverter to apply an input signal of a specific pattern in response to the switching of the connection schemes in operation 1020, and may check a response signal corresponding to the applied input signal in operation 1030.

In operation 1040, the motor control apparatus according to an example embodiment may check whether the connection is normal on the basis of whether a magnitude of the response signal is within a specified range. A motor control apparatus according to another example embodiment may estimate a parameter value of a motor connected to an inverter on the basis of a response signal, and check the type of the motor connected to the inverter on the basis of the estimated parameter value.

For example, when a magnitude of the response signal exceeds a specified range (for example, when the magnitude of the response signal is zero or equal to a magnitude of an input signal), or when the parameter value of the motor estimated based on the response signal does not correspond to the motor currently requested to start by the electronic apparatus, the motor control apparatus (for example, the controller of the motor control apparatus) may determine that the connections are abnormal, and may generate a control signal for switching the connection schemes in operation 1060 and provide the control signal to the switch.

When it is determined that the magnitude of the response signal is within a specified range and/or the parameter value obtained on the basis of the response signal is determined to correspond to the type of the motor requested to start by the electronic apparatus, the motor control apparatus determines the currently connected status as a normal connection and may generate a control signal for driving the motor currently connected to the inverter in operation 1050 and provide the control signal to the inverter unit in operation 1050.

The above-described example embodiments of the motor control apparatus and the motor control method according to the present disclosure may be applied to and implemented on a motor control apparatus provided in a motor, for example, an inverter apparatus for controlling the motor, a motor including the same, a control method for the motor, or the like. In particular, the example embodiments may be effectively applied to and implemented on a control apparatus, a control system, and a control method for controlling an initial operation of a motor, a control apparatus a control system, and a control method for aligning a position of a motor, a control apparatus, a control system, a control method for detecting a position of a motor, or the like. In addition, the example embodiments may also be effectively applied to and implemented on a compressor control apparatus provided in a compressor including a motor, for example, an inverter apparatus for controlling a motor of a compressor, a compressor including the same, a control method for the compressor, or the like. However, techniques disclosed herein are not limited thereto, and may also be applied to and implemented on all motor control apparatuses, motor control systems and motor control methods, home appliances including the motor, control apparatuses for home appliances including the motor, and control systems and control methods for home appliances including the motor to which the technical concept of the present disclosure is applicable.

Further, in the present specification, the terms "~er (or) etc." may be a hardware component, such as a processor or circuit, and/or a software component executed by the hardware configuration, such as a processor.

An aspect provides an electronic apparatus in which the number of inverters is minimized in such a manner that driving of a plurality of motors that do not need to be simultaneously driven among motors included in the electronic apparatus are controlled using one inverter.

An aspect also proposes an electronic apparatus capable of preventing malfunction of the electronic apparatus or damage to parts when the electronic apparatus is implemented to control driving of a plurality of motors with one inverter by checking whether the inverter and the motor are properly connected according to a driving situation of each of the motors, and controlling the driving of the motor on the basis of whether there is an abnormality in the connections.

The technical goals to be achieved by the present example embodiments are not limited to the above-described technical aspects, and other technical aspects which are not described may be inferred from the following example embodiments.

According to an aspect, there is provided a motor control apparatus including an inverter configured to convert direct current (DC) power into alternating current (AC) power and provide the AC power to one of a plurality of motors, a switch configured to switch connection schemes between the inverter and the plurality of motors, and a controller, and the controller may control the inverter to output an input signal of a predetermined pattern in response to the switching of the connection schemes by the switch, and generate a control signal for controlling the inverter or the switch on the basis of a response signal corresponding to the input signal.

According to another aspect, there is also provided a motor control method, the method including switching, by using a switch, connection schemes so that an inverter is connected to one of a plurality of motors, controlling the inverter to output an input signal to one motor connected to the inverter in response to the switching of the connection schemes, checking a response signal corresponding to the input signal, and generating a control signal for controlling one of the switch or the inverter on the basis of the response signal.

Specific details of other example embodiments are included in the detailed descriptions and drawings.

According to various example embodiments of the present disclosure, it is possible to reduce manufacturing costs of an electronic apparatus (for example, a clothes treating apparatus) and implement a more compact circuit design by using a motor control apparatus and method for controlling driving of two or more motors using one inverter.

Further, a response signal according to an input signal can be checked without providing a separate sensor, so that it is possible to identify whether switching of connection schemes is performed without a problem, and even when an abnormal connection occurs due to fusion of a relay or burnout of a switch, it is possible to prevent problems such as noise and equipment damage that may occur because a motor is driven without recognizing the occurrence of the abnormal connection.

Further, a situation in which another motor other than a motor corresponding to a driving command is driven while being connected to an inverter can be prevented from occurring in advance by checking whether the specific motor, which is connected to the inverter according to switching of connection schemes, is the same as the motor to be actually driven.

Effects of the present disclosure will not be limited to the above-mentioned effects and other unmentioned effects will be clearly understood by those skilled in the art from the following claims.

The above description of the present disclosure is only exemplary, and it will be understood by those skilled in the art that various modifications may be made without departing from the scope of the present disclosure and without changing essential features. Therefore, the example embodiments described above should be understood as being illustrative in all aspects instead of limiting. For example, each component described as a single entity may be distributed and implemented, and components described as being distributed may also be implemented in a combined form.

The scope of the present disclosure will be defined by the following claims rather than the above-detailed description, and all changes and modifications derived from the meaning and the scope of the claims and equivalents thereof should be understood as being included in the scope of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor control apparatus comprising:
    an inverter configured to convert direct current (DC) power into alternating current (AC) power, and to provide the AC power to any one of a plurality of motors;
    a switch configured to change connections between the inverter and the plurality of motors; and
    a controller configured to:
        control the inverter to provide an input signal having a predetermined pattern in response to the changing of the connections, and
        provide a control signal based on a response signal corresponding to the input signal,
    wherein the controller is configured to:
        provide a control signal for controlling the inverter to drive one of the motors connected to the inverter when a magnitude of the response signal is determined to be within a specified range; and
        provide a control signal for controlling the switch to again change at least one of the connections when the magnitude of the response signal is determined to exceed the specified range.

2. The motor control apparatus of claim 1, wherein the controller is configured to control the inverter to sequentially output, as the input signal, a first DC signal having a first magnitude and a second DC signal having a second magnitude.

3. The motor control apparatus of claim 1, wherein the controller is configured to control the inverter to sequentially output, as the input signal, a first AC signal having a first amplitude and a second AC signal having a second amplitude.

4. The motor control apparatus of claim 1, wherein the controller is configured to:
    determine a parameter value corresponding to the motor connected to the inverter based on the response signal; and
    control the inverter to drive the motor or control the switch to again change one of the connections, based on the parameter value.

5. The motor control apparatus of claim 1, wherein the switch includes a plurality of three-contact relays, and
    wherein each of the plurality of three-contact relays separately includes a common terminal to connect to the inverter, a normally open terminal to connect to one of the plurality of motors, and a normally closed terminal to connect to another one of the plurality of motors.

6. The motor control apparatus of claim 1, wherein the controller is configured to provide a control signal for opening or closing each of a plurality of three-contact relays included in the switch such that the inverter is connected to one of the plurality of motors.

7. The motor control apparatus of claim 1, wherein the plurality of motors includes a first motor for a drying fan and a second motor for a circulation pump.

8. The motor control apparatus of claim 1, wherein the switch includes a first relay, a second relay, and a third relay respectively connected to three output terminals of the inverter, and
    the inverter is connected to one of the plurality of motors based on an open state of one of the first relay, the second relay, and the third relay.

9. The motor control apparatus of claim 4, wherein the parameter value includes an inductance value corresponding to the motor connected to the inverter.

10. The motor control apparatus of claim 7, wherein the switch includes a first relay having first and second specific output terminals, and a second relay having first and second terminals,
    the first motor includes three input terminals, and the second motor includes three input terminals,
    wherein for the first motor, a first input terminal is connected to the first specific output terminal of the first relay, a second input terminal is connected to the second specific output terminal of the second relay, and a third input terminal is directly connected to the inverter, and
    for the second motor, a first input terminal is connected to the second specific output terminal of the first relay, a second input terminal is connected to the first specific output terminal of the second relay, and a third input terminal is directly connected to the inverter.

11. The motor control apparatus of claim 8, wherein each of the plurality of motors includes three input terminals,
    the three input terminals of each of the plurality of motors are connected to a specific output terminal of the first relay, a specific output terminal of the second relay, and a specific output terminal of the third relay, respectively.

12. The motor control apparatus of claim 8, wherein the plurality of motors includes a first motor for powering a drying fan, a second motor for powering a circulation pump, and a third motor for powering a drain pump.

13. A motor control method comprising:
    changing, by using a switch, connections between an inverter and a plurality of motors such that the inverter is connected to any one of the plurality of motors;
    controlling the inverter to provide an input signal to one of the motors connected to the inverter in response to the changing of the connections;
    receiving a response signal corresponding to the input signal; and
    providing a control signal for controlling the switch or the inverter based on the response signal,
    wherein the providing of the control signal includes:
        providing a control signal for controlling the inverter to drive one of the motors connected to the inverter when a magnitude of the response signal is determined to be within a specified range.

14. The motor control method of claim 13, wherein the providing of the control signal includes:
    performing the changing of the connections again based on a parameter value determined based on the response signal.

15. The motor control method of claim 13, wherein the providing of the control signal includes:
    providing a control signal for controlling the switch to again change at least one of the connections when the magnitude of the response signal is determined to exceed the specified range.

16. The motor control method of claim 13, wherein the inverter is to sequentially provide, as the input signal, a first DC signal having a first magnitude and a second DC signal having a second magnitude.

17. The motor control method of claim 13, wherein the inverter is to sequentially provide, as the input signal, a first AC signal having a first amplitude and a second AC signal having a second amplitude.

18. The motor control method of claim 13, wherein the providing of the control signal includes:
   determining a parameter value corresponding to the motor connected to the inverter based on the response signal; and
   control the inverter to drive the motor or control the switch to again change one of the connections, based on the parameter value.

\* \* \* \* \*